United States Patent [19]

Hoffman

[11] Patent Number: 4,647,770
[45] Date of Patent: Mar. 3, 1987

[54] ISOLATION MOUNT FOR AN OPTICAL ENCODER

[75] Inventor: Eldon P. Hoffman, Portland, Oreg.

[73] Assignee: Tektronix, Inc., Beaverton, Oreg.

[21] Appl. No.: 656,823

[22] Filed: Oct. 1, 1984

[51] Int. Cl.[4] .............................................. G01D 5/34
[52] U.S. Cl. .............................................. 250/231 SE
[58] Field of Search ...................... 250/231 SE, 237 G; 356/395; 340/347 P

[56] References Cited

U.S. PATENT DOCUMENTS

| | | | |
|---|---|---|---|
| 4,182,953 | 1/1980 | Hurley et al. | 250/231 SE |
| 4,363,026 | 12/1982 | Salmon | 250/231 SE |
| 4,501,963 | 2/1985 | Perisic | 250/231 SE |

*Primary Examiner*—David C. Nelms
*Attorney, Agent, or Firm*—David P. Petersen; Robert S. Hulse

[57] ABSTRACT

In accordance with the present invention, a drum (10) has a central shaft (11) which is rotatably mounted to a drum supporting frame (12). A mount (26) pivotally connects one side (30) of the frame (12) to a cabinet (14) for pivoting about a frame pivot (73). A mount (15) rigidly secures the other frame side (32) to the base (14). An isolation mounting bracket (86) supports an optical encoder (84) in position to monitor the velocity of the shaft (11). Bracket (86) has pivots (98, 100) which cooperate with the frame pivot (73) to provide in effect a parallelogram support structure for the optical encoder (84). Thus, the encoder (84) may translate, but not rotate, in response to vibrations of the frame (12) so as to minimize or eliminate erroneous encoder velocity readings otherwise arising from such vibrations.

11 Claims, 4 Drawing Figures

ISOLATION MOUNT FOR AN OPTICAL ENCODER

TECHNICAL FIELD

This invention relates to a mounting apparatus for supporting an optical encoder for monitoring the velocity of a rotatable drum, and in particular, to such an apparatus which isolates the encoder from the effects of vibrations of the drum supporting frame.

BACKGROUND OF THE INVENTION

In certain applications, it is important to keep track of the velocity of a rotating drum. For example, an engineering print or other document may be mounted to a drum of an optical document digitizer. In a prior art device, the drum is carried on a shaft which is rotatably mounted by bearings to a rigid frame. As the drum rotates, a document on the drum is scanned by an optical scanner including an array of photodetectors. The output of each photodetector is repeatedly integrated over time to produce digital data corresponding to the portion of the document which is scanned by the photodetector during the integration time. To insure that a uniform area of the document is scanned during each integration time interval, the velocity of the drum is monitored and the duration of the integration time interval is adjusted with variations in drum velocity. That is, the integration time is increased with decreasing drum velocities and decreased with increasing drum velocities. An optical encoder is rigidly mounted to the frame of such device in a position to sense rotations of the drum shaft and thereby monitor the velocity of the drum.

However, during normal use, the frame of these devices is occasionally bumped or jarred. This jarring can result in rotational displacement of the drum supporting frame relative to the portion of the frame which supports the optical encoder. When this occurs, the optical encoder incorrectly attributes this displacement to a change in the velocity of the drum and produces an erroneous velocity reading. As a result, integration time is incorrectly adjusted. Consequently, when the digitized data is used to reproduce copies of the print, the copies contain distortions.

Therefore, need exists for an improved mounting system for a rotatable drum and an optical encoder which is directed toward overcoming these and other disadvantages of prior art devices.

SUMMARY OF THE INVENTION

In accordance with the present invention, a drum is carried by a central shaft which is rotatably mounted to a drum supporting frame. The drum supporting frame is carried by a base or cabinet. In the illustrated form of the invention, one side of the frame is pivoted to the base for pivoting about a frame pivot axis. The other side of the frame is rigidly secured to the base. With this construction, if either the base or drum supporting frame is jarred, resulting vibrations take the form of minute rotations of the drum supporting frame about the frame pivot axis and relative to the base. An optical encoder is coupled to the end of the drum supporting shaft for monitoring the rotation of the drum supporting shaft and thereby the velocity of the drum. The body of the encoder is supported by an isolation mounting mechanism. This mechanism allows the encoder body to translate, but not rotate, even though the drum supporting frame rotates about the frame pivot axis as a result of the vibrations. This minimizes or eliminates erroneous velocity readings due to such vibrations.

More specifically, the mounting mechanism in effect comprises a parallelogram support. Therefore, when the drum supporting frame and shaft rotate about the frame pivot axis, the encoder body translates, but does not rotate relative to the frame pivot axis.

As a further specific feature of the invention, the mounting mechanism comprises an isolation mounting bracket which supports the encoder body. The isolation mounting bracket has a first generally upright leg adapted for mounting to the cabinet or base. In addition, the bracket has a second encoder body supporting leg projecting outwardly from the upper end of the first leg. The encoder body is supported in position to monitor the velocity of the drum supporting shaft. The first leg is provided with first and second pivots which are located at two of the corners of a parallelogram. The other two corners coincide respectively with the axis of the drum supporting shaft and the axis of the frame pivot.

As a still more specific aspect of the invention, the first and second pivots comprise flex points formed in the first leg of the isolation mounting bracket.

It is accordingly one object of the present invention to enhance the accuracy at which the velocity of a drum is monitored by an optical encoder.

It is still another object of the invention to provide an apparatus for mounting an optical encoder and a rotatable drum so as to minimize the effect of vibrations of the drum supporting framework on drum shaft velocity readings by the optical encoder.

A further object of the invention is to provide a mechanically simple, easily assembled, and economical apparatus for supporting a rotatable drum and an optical encoder for monitoring the drum shaft velocity.

These and other objects, features and advantages of the present invention will become apparent from the following detailed description and drawings.

DETAILED DESCRIPTION OF A PREFERRED EMBODIMENT

Figure 1:
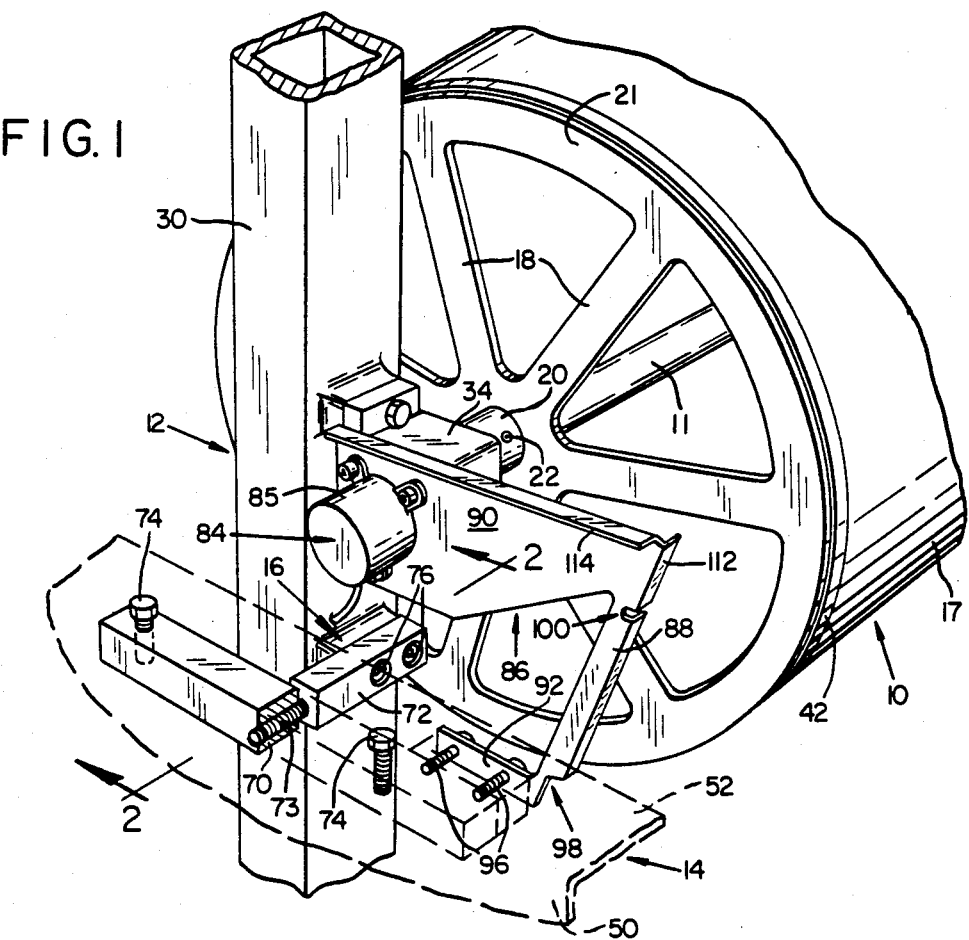
FIG. 1 is a partially broken away isometric view of a rotatable drum and an optical encoder with a mounting system in accordance with the invention.
Figure 3:
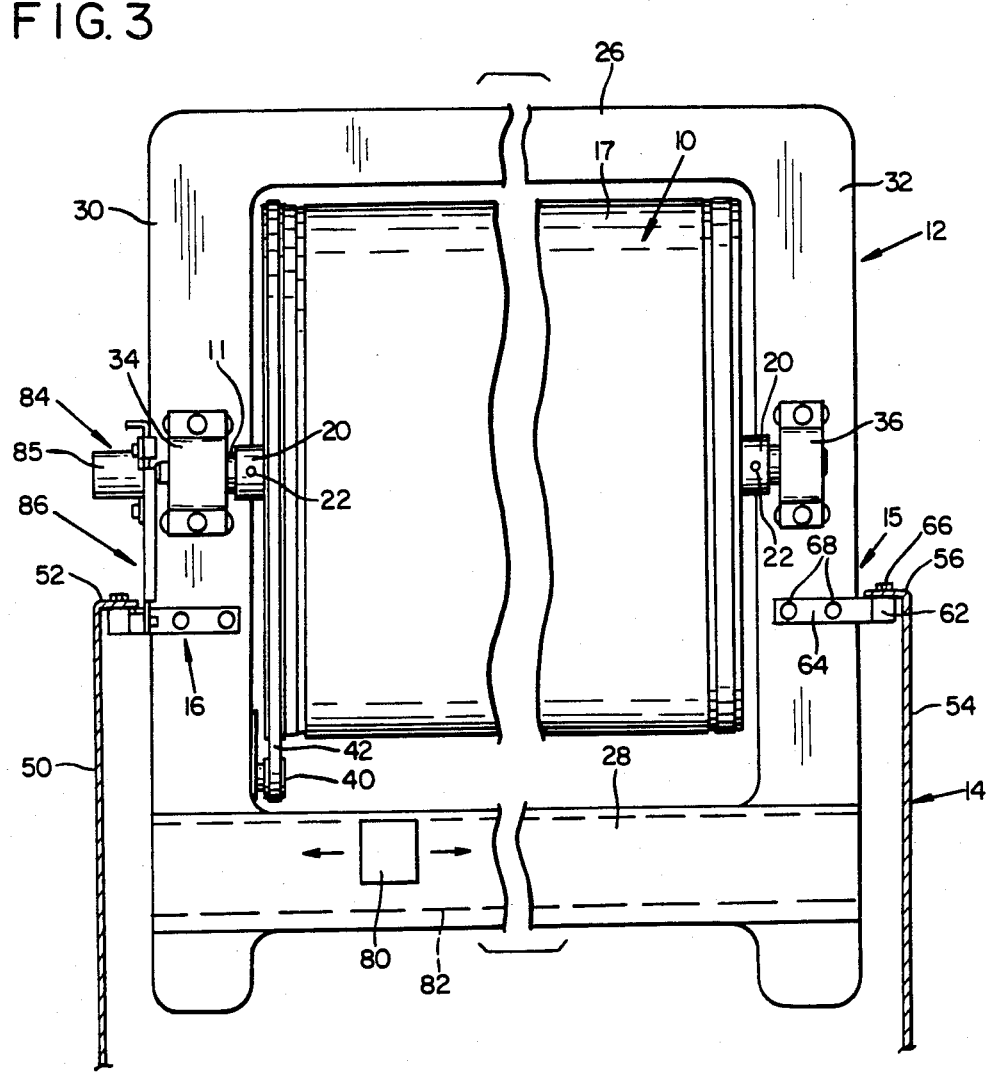
FIG. 3 is a front elevatioal view of a rotatable drum and optical encoder which are supported by a mounting system in accordance with the invention.

With reference to FIGS. 1 and 3, a drum 10 is carried by a central axially extending shaft 11 which is rotatably mounted to a drum supporting frame 12. The frame 12 is connected by respective first and second mounts 15, 16 to a frame supporting cabinet or base 14. In addition, an optical encoder 84 is provided for monitoring the velocity of the drum supporting shaft 11. The body 85 of the optical encoder is supported by an isolation mounting bracket 86 connected to the cabinet 14. As explained below, in cooperation with the mounts 15 and 16, the isolation bracket 86 operates to reduce or eliminate the effect of vibrations of the frame 12 on the velocity readings by the encoder 84.

The drum includes an outer cylindrical wall 17 and has end pieces such as shown in FIG. 1. These end pieces have a central annular collar 20 and spokes 18 which extend radially outwardly from the collar to a rim 21. The rim is connected to and reinforces the wall 17. Pins 22 pass through openings in the respective collars 20 and shaft 11 to secure the drum 10 to the central shaft.

The frame 12, in the illustrated embodiment, is of an upright construction and includes first and second vertical side members 30, 32. Side members 30, 32 are interconnected at their respective upper and lower ends by horizontal cross members 26, 28. As can be seen in FIG. 1 for side member 30, the side and cross members are of a box beam construction. Also, frame 12 is formed of a durable, rigid material, such as steel.

The shaft 11 is horizontal and has one end mounted by bearings 34 to the frame side member 30. The other end of the shaft 11 is mounted by bearings 36 to the side member 32. The drum 10 is thereby rotatable relative to the drum supporting frame 12 and the cabinet 14. The drum is rotated by a motor driven pulley 40 which is coupled to the drum by a belt 42.

The illustrated portions of the base or cabinet 14 include first and second parallel, spaced apart, vertical side walls 50, 52. The upper ends of these walls terminate in respective inwardly directed horizontal flanges 52, 54.

For reasons explained below, the first mount 15 rigidly connects the frame side member 32 to the flange 56. In addition, the second mount 16 pivotally connects the other side member 30 to the flange 52 to complete the interconnection of frame 12 to the cabinet 14.

Figure 2:
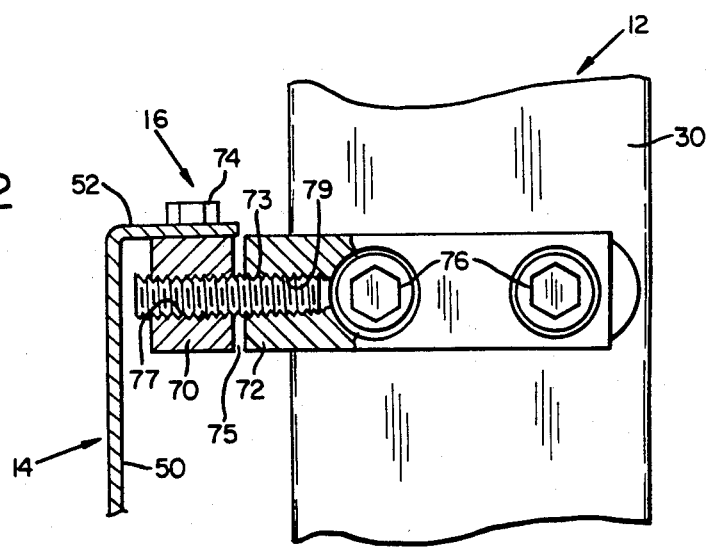
FIG. 2 is a cross-sectional view of a mount for connecting the drum supporting frame of the FIG. 1 to a cabinet of the apparatus, taken along lines 2—2 of FIG. 1.

More specifically, the first mount 15 comprises a generally T-shaped rigid mount with a cross portion 62 and a leg portion 64. Bolts 66 (one being shown in FIG. 3) secure cross portion 62 to the flange 56. The leg portion 64 is secured by bolts 68 to the frame side member 32. As best seen in FIG. 2, the mount 16 comprises a means for pivoting the frame side member 30 to the cabinet 14 at a location transversely across the cabinet from the mount 15. More specifically, the mount 16 includes a cross portion 70 and a separate leg portion 72. Bolts 74 secure cross portion 70 to the flange 52 of the cabinet 14. In addition, the leg portion 72 is secured by bolts 76 to the frame side member 30. A gap 75 between the mount portions 70, 72 provides clearance for relative pivoting of these portions. A pivot, such as a threaded screw 73 threaded into an opening 77 of cross portion 70 and into an opening 79 of leg portion 72, pivotally interconnects the portions 70, 72. Thus, the frame side member 30 is free to pivot about a frame pivot axis which comprises the axis of pivot pin 73, except insofar as such pivoting is restrained by the rigid mount 15.

With this construction, when either the frame 12 or cabinet 14 is jarred, these elements do not outwardly appear to move relative to one another. However, vibrations caused by such jarring do produce small relative motions between these elements. With the above described construction, such motion is effectively confined to rotation of the drum supporting frame 12, and thus the supported drum 10 and shaft 11, about the axis of the pivot 73.

As mentioned above, in certain applications, it is desirable to precisely determine the velocity of the drum. As a specific example, an optical scanner 80 may be slidably mounted to a carriage or track, represented by the dashed lines 82 in FIG. 3. The scanner 80 optically scans an engineering print or other document supported on the drum. Data generated from this scanning is digitized and stored for subsequent use in reproducing additional copies of the drawing. As explained previously, in generating this data, it is important to monitor the velocity of the drum.

In the present invention, a commercially available rotary optical encoder 84, such as produced by Dynamics Research Corporation, is provided for monitoring the velocity of the shaft 11 and thus of the drum. The optical encoder 84 includes an encoder disk (not shown) which is coupled to the drum shaft 11 for rotation with the shaft. The encoder also has an encoder body 85 which is mounted by the isolation mounting bracket 86 to the cabinet 14. The encoder 84 has circuitry which provides an output signal corresponding to the rotations of the shaft and thus to the velocity of the drum. As explained above, the shaft velocity represented by the output of the optical encoder 84 differs from the actual shaft velocity, then errors may be introduced in data which is produced during optical scanning of a document on the drum. One possible source of error in the velocity readings, which is reduced or eliminated by the present invention, arises from vibration induced rotations of the frame 12, and hence of the supported shaft 11 and drum 10, relative to the encoder body 85.

As previously mentioned, in the present construction, the drum supporting frame 12 is specifically designed to pivot, in response to vibrations, about a pivot 73. To reduce or eliminate errors in velocity readings otherwise arising from such pivoting, the encoder body 85 is supported by a parallelogram mounting structure. This structure permits translation of the encoder body 85 in response to such frame rotations, but does not allow the encoder body to rotate relative to the frame 12.

Figure 4:
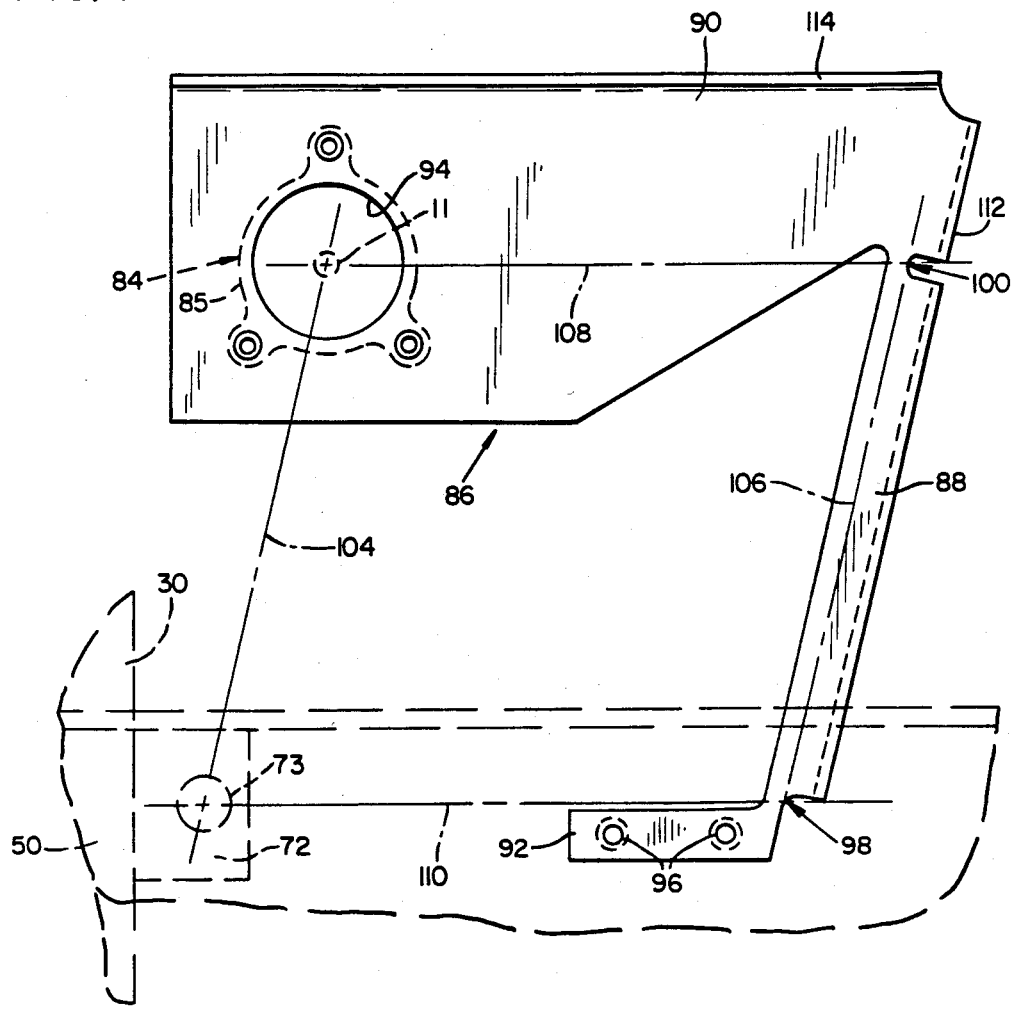
FIG. 4 is a front elevational view of the optical encoder isolation mounting bracket of the apparatus of FIG. 1.

In the illustrated embodiment, this mounting structure includes the isolation mounting bracket 86. With reference to FIG. 4, the bracket 86 includes a first upwardly extending leg 88, an encoder body supporting plate 90 projecting toward the frame side portion 30 from the upper end of the leg 88, and a mounting flange 92 projecting from the lower end of the leg 88 in a direction parallel to the plate 90. The leg 88 and plate 90 include respective reinforcing flange portions 112, 114. Also, the bracket is formed of a rigid durable material, such as from aluminum sheet stock. The leg 88 is provided with spaced apart pivots 98 and 100 which may comprise bearings, but, in the illustrated embodiment, are formed by removing portions of the leg 88 at the designated locations. This reduces the dimension of and weakens the leg 88 at such locations and enables the leg 88 to flex and in effect pivot at these locations. By using flex points instead of bearings, backlash in the structure due to play in other than extremely expensive bearings, is eliminated. Also, the encoder body 85 is mounted to the flange 90 with a drum shaft engaging portion of the encoder projecting through a flange opening 94 for coupling into engagement with the shaft 11. In addition, the bracket mounting flange 92 is secured to the cabinet 14 by bolts 96.

This construction provides, in effect, a parallelogram support for the encoder body. Specifically, one leg 110 of the parallelogram is provided by the portion of the cabinet wall 50 between the axis of frame pivot 73 and the flex point 98. Another leg 108, parallel to leg 110, is provided by the portion of the flange 90 between its intersection with a line along the axis of the shaft 11 and the flex point 100. Still another leg 104 of the parallelogram extends from the axis of frame pivot 73 to the axis of shaft 11 and in effect is provided by the mount 16, frame 30, bearings 34 and the shaft 11. The final leg 106 of the parallelogram, is parallel to the leg 104, and extends between the flex points 98 and 100. As is apparent, in the specifically illustrated embodiment, an obtuse angle exists between the legs 110 and 106 and an acute angle exists between the legs 104 and 110.

With this construction, rotation of the drum supporting frame 12 about the frame pivot 73, as a result of jarring induced vibrations, do not produce a rotation of the encoder body 85 relative to the shaft 11. Instead, due to the cooperation between frame mount 16 and the isolation mounting bracket 86, the encoder body 85 translates, but does not rotate. As a result, even though vibrations are present, they do not result in erroneous velocity readings by the optical encoder.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. An isolation mounting system for supporting a rotatable drum and an optical encoder which monitors the velocity of a central shaft of the drum comprising:
   a base;
   drum supporting frame means for supporting the drum shaft and thereby the drum for rotation about a drum axis;
   first mounting means for rigidly connecting the drum supporting frame means to the base at a first location;
   second mounting means for pivotally connecting the drum supporting frame means to the base at a second location such that the drum supporting frame means pivots about a frame pivot axis which is spaced from the drum axis; and
   parallelogram support means connected to the base for supporting the optical encoder in position to monitor the velocity of the drum shaft, said support means comprising encoder mounting means for permitting translation of the optical encoder relative to the frame pivot axis while restricting rotation of the optical encoder relative to the frame pivot axis.

2. An isolation mounting system according to claim 1 in which said parallelogram support means comprises optical encoder mounting bracket means having first and second spaced apart pivots, the first pivot being along a first line through the first pivot and the frame pivot axis, the second pivot being along a second line parallel to the first line and extending through the second pivot and a point in line with the axis of the shaft, the first and second pivots being along a third line which is parallel to a fourth line through the frame pivot axis and the point in line with the axis of the shaft.

3. An isolation mounting system according to claim 2 in which an obtuse angle exists between the portion of the first line between the frame pivot axis and the first pivot and the portion of the third line between the first and second pivots.

4. An isolation mounting system according to claim 2 in which the first and second pivots comprise flex points formed in the mounting bracket means.

5. An isolation mounting system according to claim 4 in which said mounting bracket means includes an upwardly extending leg, an optical encoder supporting plate projecting toward the drum supporting frame from the upper end of the leg, and a mounting means at the lower end of the leg for mounting the bracket to the base, and in which the flex points are located at spaced locations along the leg.

6. An isolation mount for an optical encoder for monitoring the velocity of a rotatable object which is supported for rotation about an axis of rotation by a frame, the frame having a frame pivot spaced from the axis of rotation, the frame pivot being pivotal about a frame pivot axis which is parallel to the axis of rotation, the mount comprising:
   elongated leg means for mounting to the frame;
   an optical encoder support means projecting from the leg means for supporting the optical encoder in position to monitor the velocity of the rotatable object;
   the leg means having first and second pivots spaced apart along its length for pivoting about first and second pivot axes parallel to the axis of rotation and to the frame pivot axis, the first and second pivot axes, the axis of rotation and the frame pivot axis each being positioned along respective lines which intersect a respective corner of a parallelogram, whereby translation of the optical encoder relative to the frame pivot axis is permitted while rotation of the optical encoder relative to the frame pivot axis is restricted.

7. An isolation mount according to claim 6 in which the first and second pivots comprise respective flex points formed in the leg means.

8. An isolation mount according to claim 6 in which said optical encoder support means comprises a support plate projecting outwardly in a first direction from an upper portion of the leg means, the mount also including mounting flange means projecting outwardly in the first direction from a lower portion of the leg means.

9. An isolation mount according to claim 6 in which an acute angle exists between a first line between the first and second pivots and a second line between one of the pivots and a point of the encoder support means which is at a position which is along the axis of an optical encoder shaft when the optical encoder is mounted to the optical encoder support means.

10. An isolation mounting bracket for an optical encoder for monitoring the velocity of a rotatable object which is supported for rotation about an axis of rotation by a frame, the frame having a frame pivot spaced from the axis of rotation, the frame pivot being pivotal about a frame pivot axis which is parallel to the axis of rotation, the mounting bracket comprising:
   an elongated leg, the leg including a pair of first and second flex points spaced apart a predetermined distance from each other along the length of the leg;
   the leg including a mounting flange for mounting the leg to the frame such that the first and second flex points are at respective corners of a parallelogram defined by lines which extend from the axis of rotation to the second flex point, from the second flex point to the first flex point, from the first flex point to the frame pivot axis and from the frame pivot axis to the axis of rotation;

an optical encoder supporting plate projecting outwardly in a first direction from the upper end of the leg, the plate having an optical encoder mounting opening aligned with the axis of rotation and through which a portion of the optical encoder extends upon mounting of the optical encoder to the plate; and the mounting flange projecting outwardly in the first direction from the lower end of the leg, whereby translation of the optical encoder relative to the frame pivot axis is permitted while rotation of the optical encoder relative to the frame pivot axis is restricted.

11. An isolation mounting bracket according to claim 10 in which the leg has a reinforcing flange along one side edge and the plate has a reinforcing flange along one side edge.

* * * * *